(12) United States Patent
Machida

(10) Patent No.: US 7,728,996 B2
(45) Date of Patent: Jun. 1, 2010

(54) IMAGE PROCESSING APPARATUS

(75) Inventor: Masahiro Machida, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1450 days.

(21) Appl. No.: 11/022,974

(22) Filed: Dec. 28, 2004

(65) Prior Publication Data

US 2005/0175215 A1 Aug. 11, 2005

(30) Foreign Application Priority Data

Jan. 6, 2004 (JP) ............................. 2004-000991
Dec. 27, 2004 (JP) ............................. 2004-375561

(51) Int. Cl.
- G06F 3/12 (2006.01)
- G06K 15/00 (2006.01)
- G06F 21/00 (2006.01)

(52) U.S. Cl. ...................... 358/1.15; 358/1.14; 713/182
(58) Field of Classification Search ........................ None
See application file for complete search history.

(56) References Cited

U.S. PATENT DOCUMENTS

| | | | |
|---|---|---|---|
| 6,615,372 B1 * | 9/2003 | Wang ........................... | 714/46 |
| 6,880,091 B1 * | 4/2005 | Mattis et al. .................... | 726/5 |
| 7,454,780 B2 | 11/2008 | Katsube et al. | |
| 2003/0043416 A1 * | 3/2003 | Rublee et al. ............... | 358/402 |
| 2004/0119746 A1 * | 6/2004 | Mizrah ........................ | 345/763 |
| 2005/0046890 A1 * | 3/2005 | Shudo ........................ | 358/1.14 |
| 2005/0091612 A1 * | 4/2005 | Stabb et al. .................. | 715/816 |
| 2006/0026434 A1 * | 2/2006 | Yoshida et al. ............... | 713/182 |
| 2006/0062588 A1 * | 3/2006 | Saka et al. ..................... | 399/80 |

FOREIGN PATENT DOCUMENTS

| | | |
|---|---|---|
| CN | 1249605 C | 4/2003 |
| CN | 1410912 A | 4/2003 |
| EP | 1 298 886 A2 | 4/2003 |
| JP | A-5-333775 | 12/1993 |
| JP | A 11-134163 | 5/1999 |
| JP | A2000-353066 | 12/2000 |
| JP | A 2001-216104 | 8/2001 |
| JP | A-2003-330686 | 11/2003 |
| JP | A-2003-337868 | 11/2003 |

OTHER PUBLICATIONS

Dec. 2, 2009 Office Action issued in Japanese Application No. FE04-06639.
Dec. 2, 2009 Office Action issued in Japanese Application No. 2004-375561.

* cited by examiner

Primary Examiner—Mark K Zimmerman
Assistant Examiner—Mesfin Getaneh
(74) Attorney, Agent, or Firm—Oliff & Berridge, PLC

(57) ABSTRACT

An image processing apparatus includes an input unit to input an image, a connection unit to perform connection to an external network, an output unit to output a request for processing the input image to a unit connected thereto through the external network, and a control unit to perform connection to an authentication unit connected to the external network using the connection unit and requesting the authentication unit for an authentication process, when the output unit outputs the request for the processing.

6 Claims, 11 Drawing Sheets

IMAGE PROCESSING APPARATUS

BACKGROUND OF THE INVENTION

1. Field of the Invention

The present invention relates to an image processing apparatus for processing an image input through an input unit and outputting the input image through an output unit, which can be connected to an external network.

2. Description of the Related Art

Conventionally, image processing apparatuses such as copying machines have a copy function of reading out (scanning in) images of scripts placed on platens and transferring and outputting the scanned-in images onto sheets. There are also provided multifunction machines having a variety of functions such as a facsimile function of transmitting the scanned-in images in a facsimile way, a print function of printing out the images transmitted from personal computers through networks such as LAN (Local Area Network), etc., in addition to the copy function.

Recently, multifunction machines came to the market, which can utilize services using external networks, such as a scan-mail function of transmitting the scanned-in images with an electronic mail, a mail receiving function of receiving an electronic mail from an external mail server, etc. as well as the copy function, the facsimile function, and the print function (for example, see JP-A-11-134163).

However, when enjoying a variety of services from the image processing apparatuses using the external network, a structure for performing authentication using an authentication system connected to the external network has not been realized. That is, the conventional image processing apparatuses have a built-in authentication system so as to restrict or manage usage of the image processing apparatuses, but do not have a structure of accessing the external authentication server and performing the authentication process, so that a problem with security in dealing with information using the external network has come up.

SUMMARY OF THE INVENTION

According to an aspect of the present invention, an image processing apparatus includes an input unit to input an image, a connection unit to perform connection to an external network, an output unit to output a request for processing the input image to a unit connected thereto through the external network, and a control unit to perform connection to an authentication unit connected to the external network using the connection unit and requesting the authentication unit for an authentication process, when the output unit outputs the request for the processing.

According to the present invention described above, the image processing apparatus for performing a variety of output services of the image input through the input unit can request the authentication unit connected to the external network for the authentication process, so that it is possible to enhance the security in dealing with information on a variety of output services using the external network.

Therefore, according to the present invention, when the image processing apparatus performs the input and output of information on a variety of servers connected to the external network, the authentication process can be performed using the authentication unit connected to the external network, so that the security in dealing with the information can be enhanced due to the authentication process accompanied by a variety of output services. As a result, it is possible to improve reliability in providing the services.

BRIEF DESCRIPTION OF THE DRAWINGS

Preferred embodiments of the present invention will be described in detail based on the following figures, wherein:

FIG. 5 is a diagram illustrating an example of a setting picture;

FIG. 6 is a diagram illustrating an example where a setting picture for a variety of processes and an authentication picture are displayed simultaneously;

DETAILED DESCRIPTION OF THE INVENTION

Figure 1:
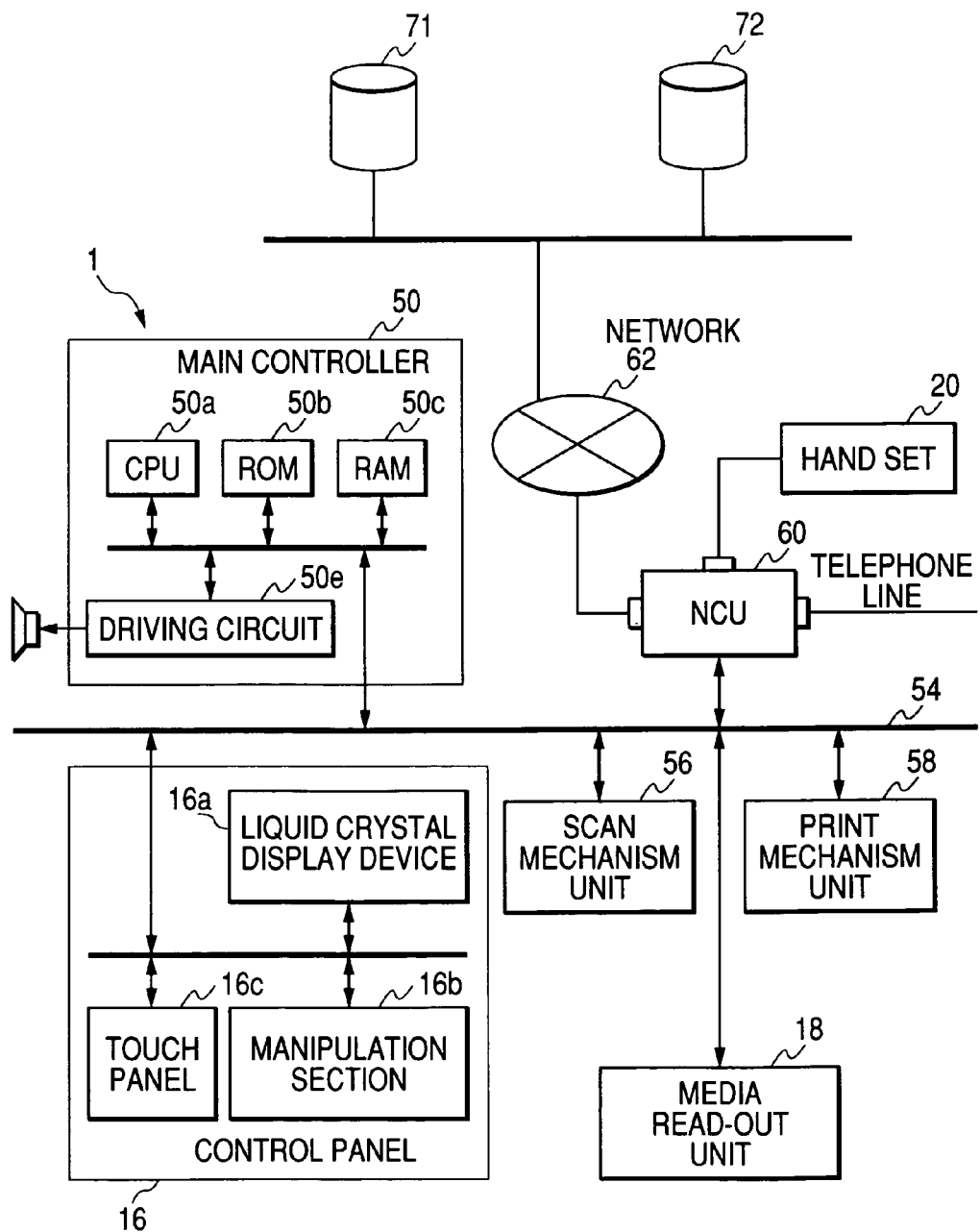
FIG. 1 is a block diagram illustrating an image processing apparatus according to the present embodiment.

Hereinafter, embodiments of the present invention will be described with reference to the drawings. FIG. 1 is a block diagram illustrating an image processing apparatus according to the present embodiment. That is, the image processing apparatus 1 includes a main controller 50 connected to a bus 54, a control panel 16, a scanner mechanism unit 56, a print mechanism unit 58, a media readout unit 18, and an NCU (Network Control Unit) 60.

The main controller 50 includes a CPU 50a as a control unit, a ROM (Read Only Memory) 50b for storing a variety of control programs, a RAM (Random Access Memory) 50c used as a working area of the programs, and a driving circuit 50e.

The control panel 16 serves as a user interface, and includes a liquid crystal display section 16a as a display unit to display a variety of information pieces, a manipulation section 16b having hard keys, etc., and a touch panel 16c overlapping the liquid crystal display section 16a.

The scanner mechanism unit 56 serves as an input unit to input (scanning in) images, and includes an image input device such as a CCD (Charge Coupled Device), an optical system having a light source and mirrors, and a movement system for moving the mirrors, etc.

The print mechanism unit 58 serves as an output unit to transfer and output the images input through the scanner mechanism unit 56 onto a medium such as paper, and includes an image processor, an image forming section, an image transfer section, and a sheet carrying section. The output unit according to the present embodiment also performs a process of outputting (transmitting) the images to an external network 62 through the network control unit (NCU) 60, in addition to the process of transferring and outputting the images onto the medium such as paper. The media read-out unit 18 reads out information of a variety of recording media.

The network control unit (NCU) 60 is a control unit for accessing a telephone line or the external network 62. Since a hand set 20 is fitted to the NCU 60, telephone conversation can be carried out through the telephone line.

The image processing apparatus 1 according to the present embodiment can perform connection to an authentication server (authentication unit) 71 connected to the external network 62 using the NCU 60 and request the authentication server 71 for an authentication process under control of the CPU 50a, when the output unit outputs the images.

Figure 2:
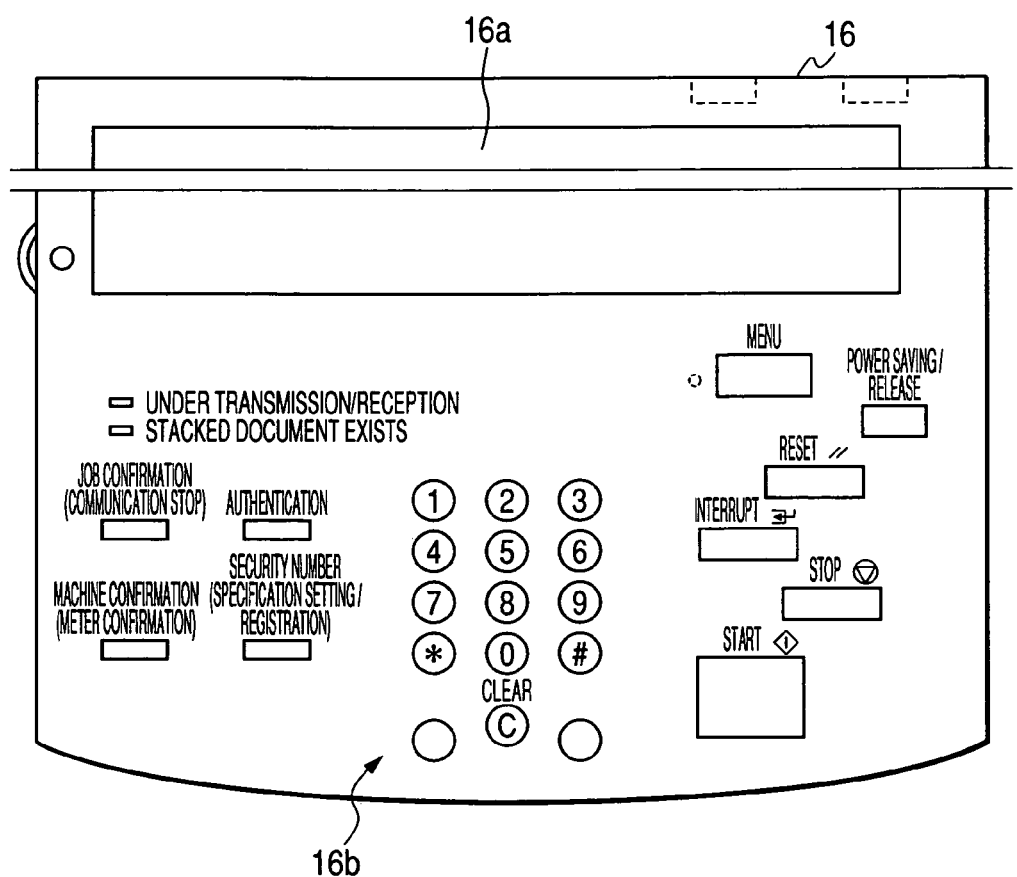
FIG. 2 is a diagram illustrating an appearance of a control panel.
Figure 3:
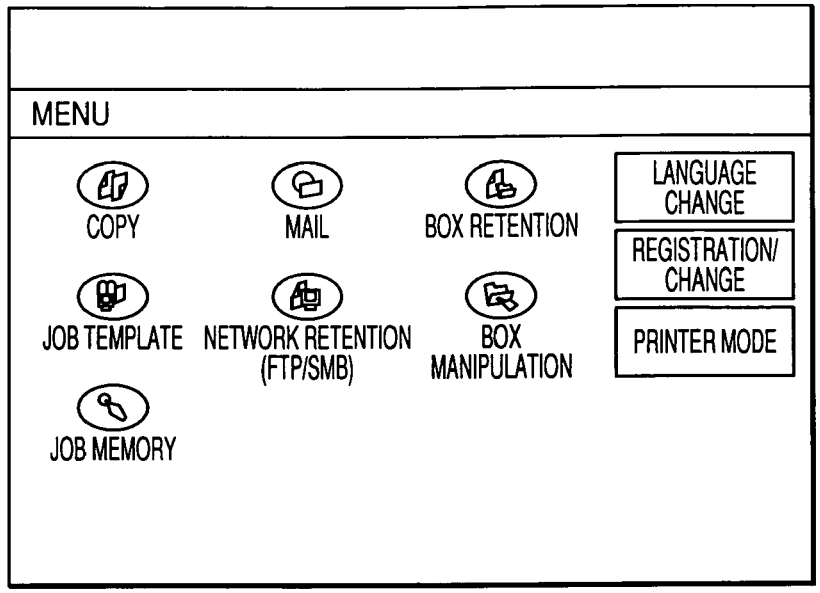
FIG. 3 is a diagram illustrating an example of a menu picture.

Here, an appearance of the control panel 16 as a user interface is shown in FIG. 2, and a representative menu picture displayed in the liquid crystal display section 16a is shown in FIG. 3. The liquid crystal display section 16a is disposed at the upper portion of the control panel 16 and a variety of hard keys as the manipulation section 16b are disposed below the liquid crystal display section. The hard keys include ten keys as numerals, a "menu" button, a "start" button, a "reset" button, a "stop" button, a "job confirmation" button, a "machine confirmation" button, an "authentication" button, a "security number" button, etc. A "under transmission/reception" lamp indicating a communication state with the external network 62 and an "accumulated document exist" lamp indicating whether an accumulated document exists or not are further disposed.

When the "menu" button among the hard keys is pressed, the menu picture shown in FIG. 3 is displayed in the liquid crystal display section 16a. In this example, icons (soft keys) of "copy", "mail", "box retention", "job template", "box manipulation", and "job memory" are displayed.

Among these, for example, the function of "mail" is a function of transmitting and receiving a mail using a mail server 72 connected to the external network 62. When an instruction to transmit the images, scanned in on the basis of a variety of settings of the image processing apparatus 1, with a mail based on the settings is given, the mail server 72 transmits the images with a mail. In addition, the mail server accumulates received mails and outputs the accumulated mails to the image processing apparatus 1 in response to the request from the image processing apparatus 1. The mail server 72 may have a function of storing information such as mail addresses and providing the information such as mail addresses in response to the request from the image processing apparatus 1, in addition to the functions of transmitting and receiving a mail. When the services are executed using the processors through the external network 62, the image processing apparatus 1 according to the present embodiment requests the authentication server 71 connected to the external network 62 to perform an authentication process.

Figure 4:
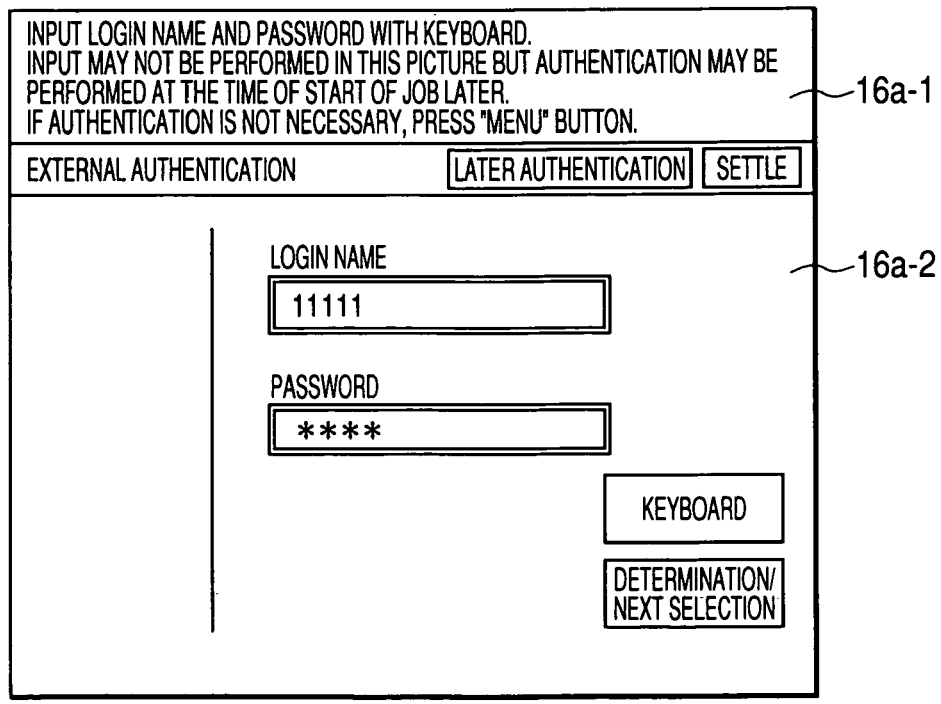
FIG. 4 is a diagram illustrating an example of an authentication picture.

FIG. 4 is a diagram illustrating an example of a screen display (authentication picture) when performing the authentication process. The authentication picture is displayed at a given time after pressing, for example, the "mail" button on the menu picture. In the authentication picture, a message display section is displayed at the upper portion 16a-1, and a text box for inputting a login name and a text box for inputting a password are displayed at the center portion 16a-2. The order of authentication and the time for authentication will be described later.

Figures 5, 6:
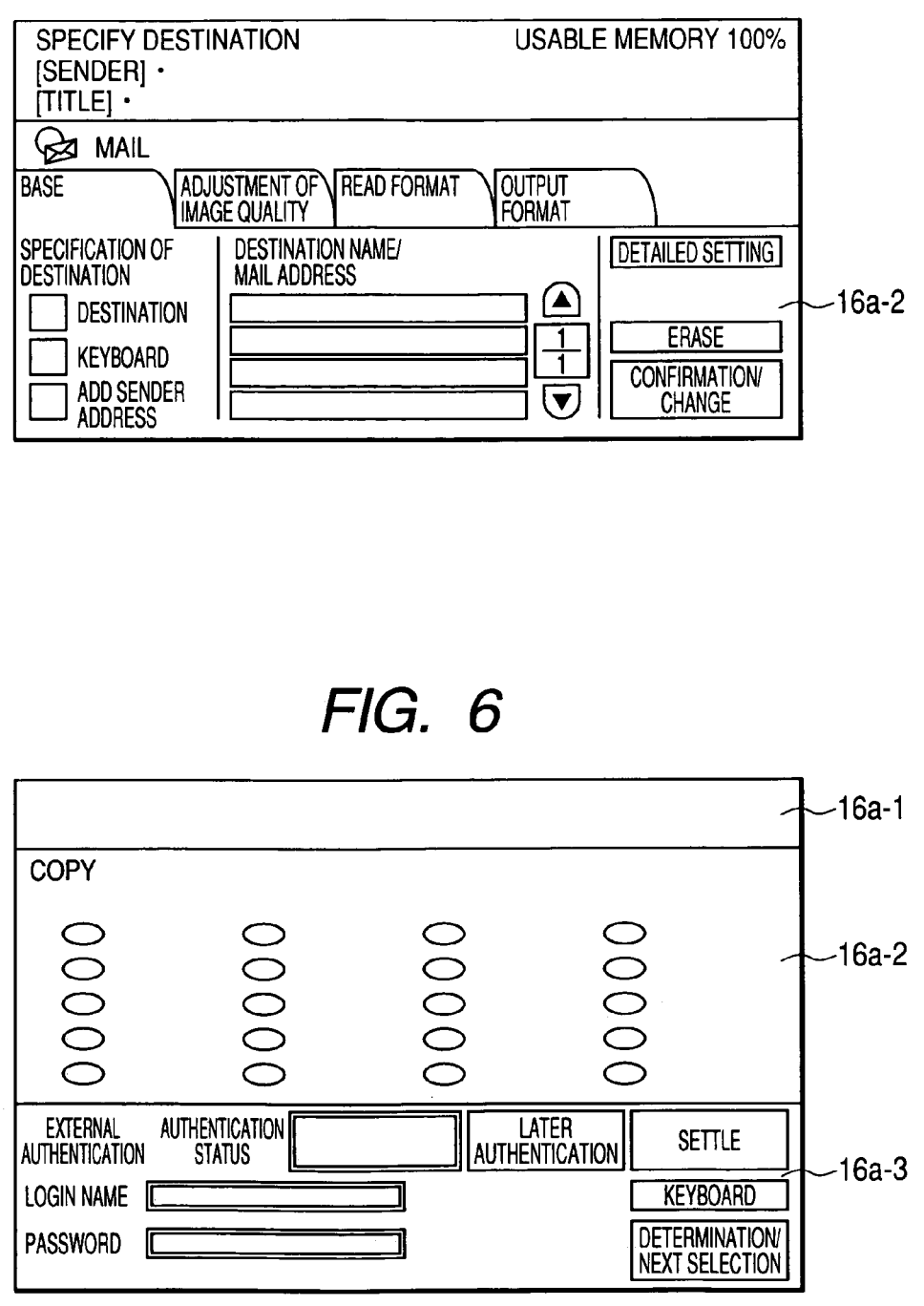

FIG. 5 is a diagram illustrating an example of a setting picture displayed when the "mail" button is pressed on the menu picture. In this setting picture, a text box for inputting a destination name or address of a mail is displayed at the center portion 16a-2. Concentration, script quality, resolution, file format when reading out the image to transmit with a mail can be set.

FIG. 6 is a diagram illustrating an example where the setting picture and the authentication picture for a variety of processes are simultaneously displayed. The authentication picture (see FIG. 4) or the setting picture for a mail (see FIG. 5) described above is displayed at a given time. The authentication picture and the setting picture may be displayed independently and may be displayed simultaneously as shown in FIG. 6. In this example, a message section is displayed at the upper portion 16a-1, the setting picture is displayed at the center portion 16a-2, and the authentication picture is displayed at the lower portion 16a-3. When the authentication picture is displayed along with the setting picture, it can be seen that authentication is required and the input of a request for authentication can be easily executed after or during performing various settings.

Next, the specific order and time of authentication will be described. In the following description, the mail function is exemplified, but the same is true of functions requiring authentication for other services. The respective procedures described below are realized by allowing the CPU 50a shown in FIG. 1 to control respective sections.

Figure 7:
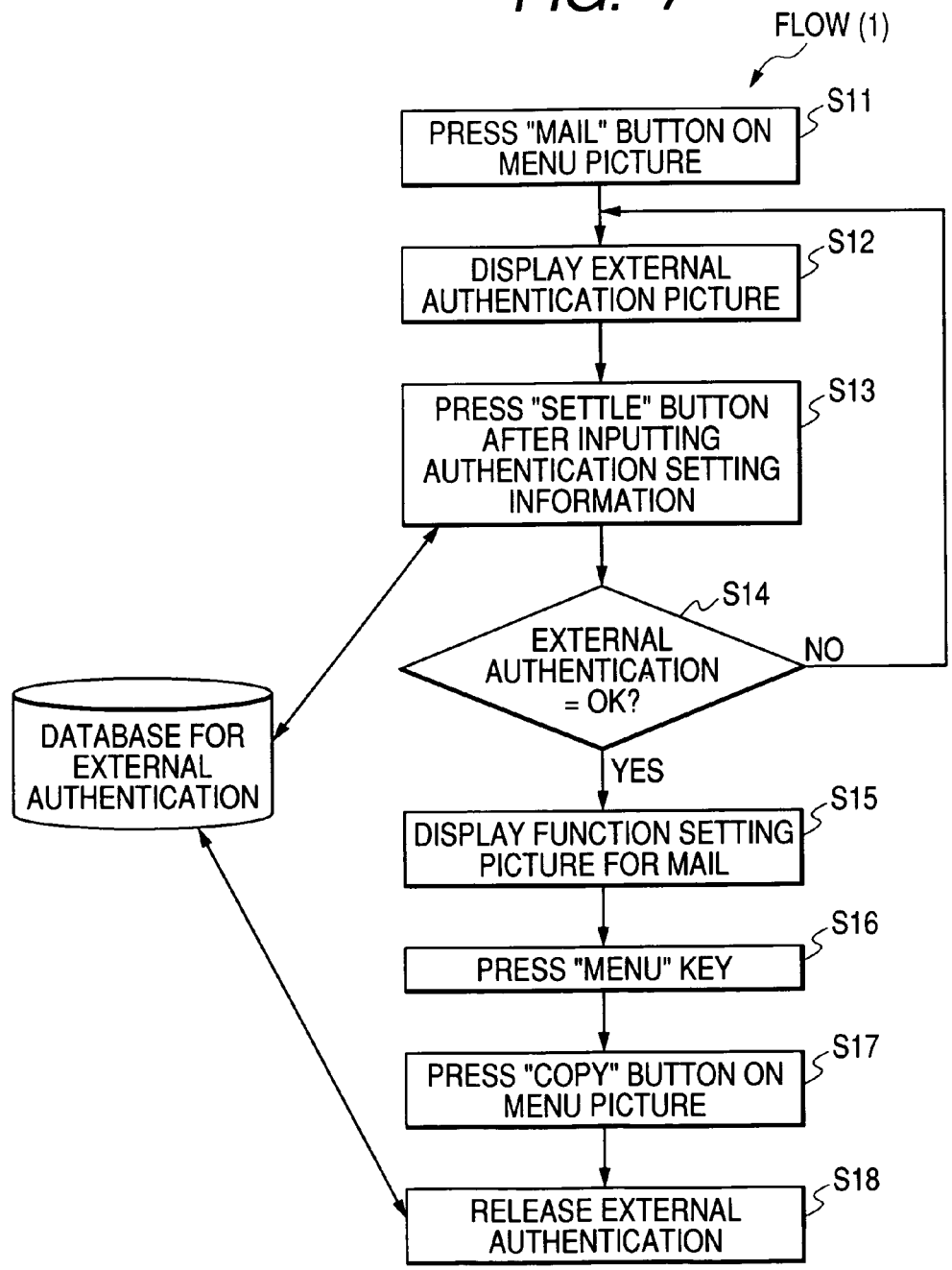
FIG. 7 is a flowchart explaining a first control procedure.

First, a first procedure will be described with reference to the flowchart (Flow (1)) of FIG. 7. When a user selects and presses the "mail" button on the menu picture (see FIG. 3) (step S11), an external authentication picture (see FIG. 4) is displayed (step S12).

Next, when a login name or password is input to the text box on the authentication picture and the "settle" button is pressed (step S13), the CPU 50a shown in FIG. 1 requests the authentication server 71 for the authentication process via the external network 62 from the NCU 60 and waits for acquiring authentication (step S14). The authentication server 71 is provided with a database for external authentication, and the authentication process is performed using the database. In the course of performing the authentication process, for example, a message of "now under authentication" may be displayed on the screen. Here, when the authentication is not acquired, the procedure returns to step S12.

When the authentication is acquired, a picture for setting functions of a mail shown in FIG. 5 is displayed (step S15). By pressing the "start" key on the control panel 16 shown in FIG. 2 after performing a variety of settings, the mail function is executed.

Thereafter, when the "menu" key is pressed (step S16) and the "copy" button is pressed in a state where the menu picture shown in FIG. 3 is displayed (step S17), the process requiring the external authentication is switched to a process not requiring the external authentication. Then, the CPU 50a requests the authentication server 71 to release the authentication process via the network 62 from the NCU 60 (step S18). As a result, the release of the authentication process is performed, so that the normal copy function can be utilized.

In the procedure of Flow (1), the authentication process by the authentication server 71 connected to the external network 62 is performed at the time of receiving a service requiring the authentication such as mail and is released at the time of finishing the service requiring the authentication. As a result, a user can select a service requiring the authentication and can acquire the authentication at once, thereby smoothly performing next processes. The image processing apparatus 1 may not have information necessary for performing a service. When execution of such a service is instructed, the authentication needs to be acquired for accessing the mail server 72 at the time of starting the setting of, for example, a mail service, so that it is necessary to access the authentication server 71. When the authentication is acquired, the image processing apparatus 1 can access the mail server 72 and can obtain information necessary for the setting or the service, such as an address list stored in the mail server 72, information of the setting picture, information on restriction such as an upper limit of data capacity of a transmittable mail, etc.

Figure 8:
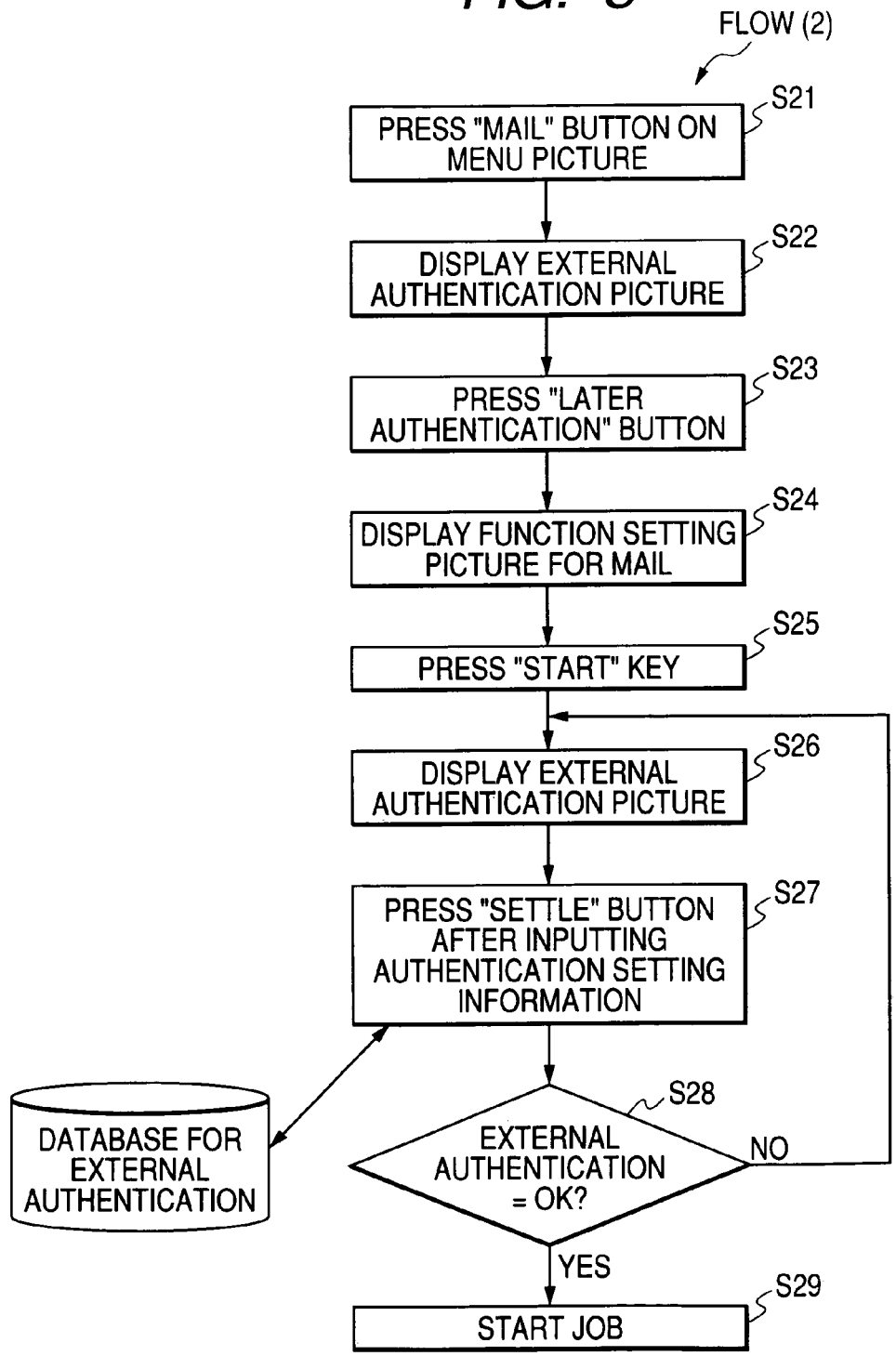
FIG. 8 is a flowchart explaining a second control procedure.

Next, a second procedure will be described with reference to the flowchart (Flow (2)) of FIG. 8. When a user selects and presses the "mail" button on the menu picture (see FIG. 3) (step S21), an external authentication picture (see FIG. 4) is displayed (step S22).

Next, when the "later authentication" button on the authentication picture is pressed (step S23), the authentication process is not performed at that time but the function setting picture for a mail shown in FIG. 5 is displayed (step S24). A variety of settings such as the input of a destination, the adjustment of image quality of a color mode, etc., the image scanning format of resolution, concentration, etc., the output format of a file format to be output, etc. are performed. In the course of performing the input for a variety of settings in the function setting picture, a message indicating a non-authenticated state may be displayed, because the "later authentication" is instructed. When the "start" key on the control panel 16 shown in FIG. 2 is pressed (step S25) after performing the input for a variety of settings, the external authentication picture (see FIG. 4) is displayed right before performing the process, because it is in the non-authenticated state.

Next, when a login name or password is input to the text box on the authentication picture and the "settle" button is pressed (step S27), the CPU 50$a$ shown in FIG. 1 requests the authentication server 71 for the authentication process via the external network 62 from the NCU 60 and waits for acquiring the authentication (step S28). The authentication server 71 is provided with a database for the external authentication, and the authentication process is performed using the database. Here, when the authentication is not acquired, the procedure returns to step S26.

When the authentication is acquired, a job of the main function is started in accordance with the previously-performed setting details (step S29).

In the procedure of Flow (2), since the authentication process by the authentication server 71 connected to the external network 62 is performed in the course of processing a service requiring the authentication such as a mail after receiving the service (right before starting the job in the aforementioned example), a user can complete a variety of settings before executing the authentication process. As a result, the job can be executed right after the authentication is acquired.

Figure 9:
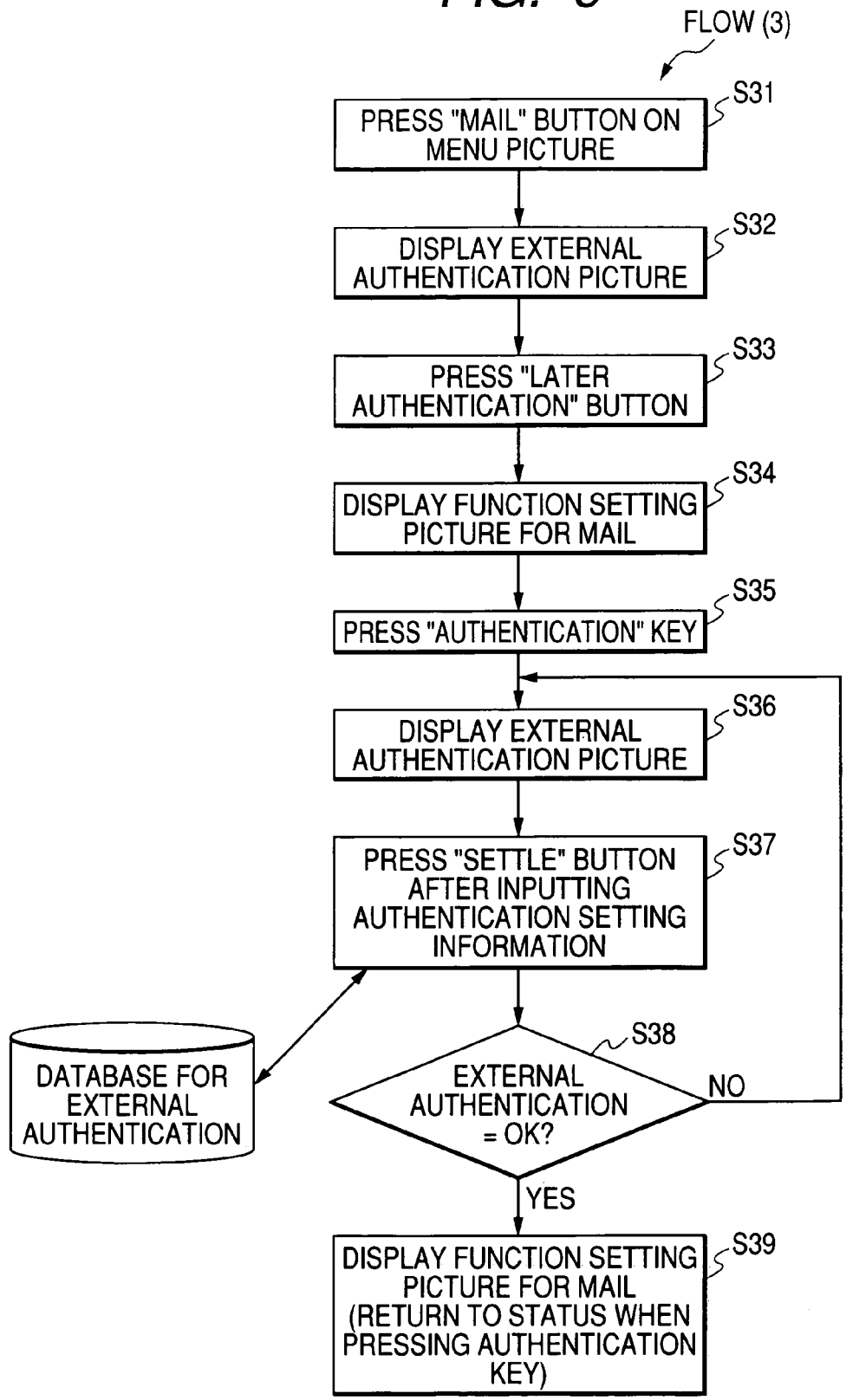
FIG. 9 is a flowchart explaining a third control procedure.

Next, a third procedure will be described with reference to the flowchart (Flow (3)) of FIG. 9. When a user selects and presses the "mail" button on the menu picture (see FIG. 3) (step S31), the external authentication picture (see FIG. 4) is displayed (step S32).

Next, when the "later authentication" button on the authentication picture is pressed (step S33), the authentication process is not performed at that time but the function setting picture for a mail shown in FIG. 5 is displayed (step S34). In the course of performing the input for a variety of settings in the function setting picture, the message indicating a non-authenticated state may be displayed, because the "later authentication" is instructed. Thereafter, even in the course of performing the input for a variety of settings in a state where the function setting picture for a mail is displayed, when the "authentication" key on the control panel 16 shown in FIG. 2 is pressed (step S35), the external authentication picture (see FIG. 4) is displayed (step S36).

Next, when a login name or password is input to the text box on the authentication picture and the "settle" button is pressed (step S37), the CPU 50$a$ shown in FIG. 1 requests the authentication server 71 for the authentication process via the external network 62 from the NCU 60 and waits for acquiring the authentication (step S38). The authentication server 71 is provided with the database for the external authentication, and the authentication process is performed using the database. Here, when the authentication is not acquired, the procedure returns to step S36.

When the authentication is acquired, the function setting picture for a mail shown in FIG. 5 is displayed (step S39). When the "start" key on the control panel 16 shown in FIG. 2 is pressed after performing a variety of settings, the job for a mail function is started.

In the procedure of Flow (3), since the authentication process by the authentication server 71 connected to the external network 62 can be performed at a given time determined by the user, the user can execute the external authentication properly at a desired time. Here, an example is described where the "authentication" key is pressed when the function setting picture is displayed. However, the "authentication" key may be pressed at the time of displaying other pictures, and after completing the authentication process, the screen display when the "authentication" key is pressed is restored.

Figure 10:
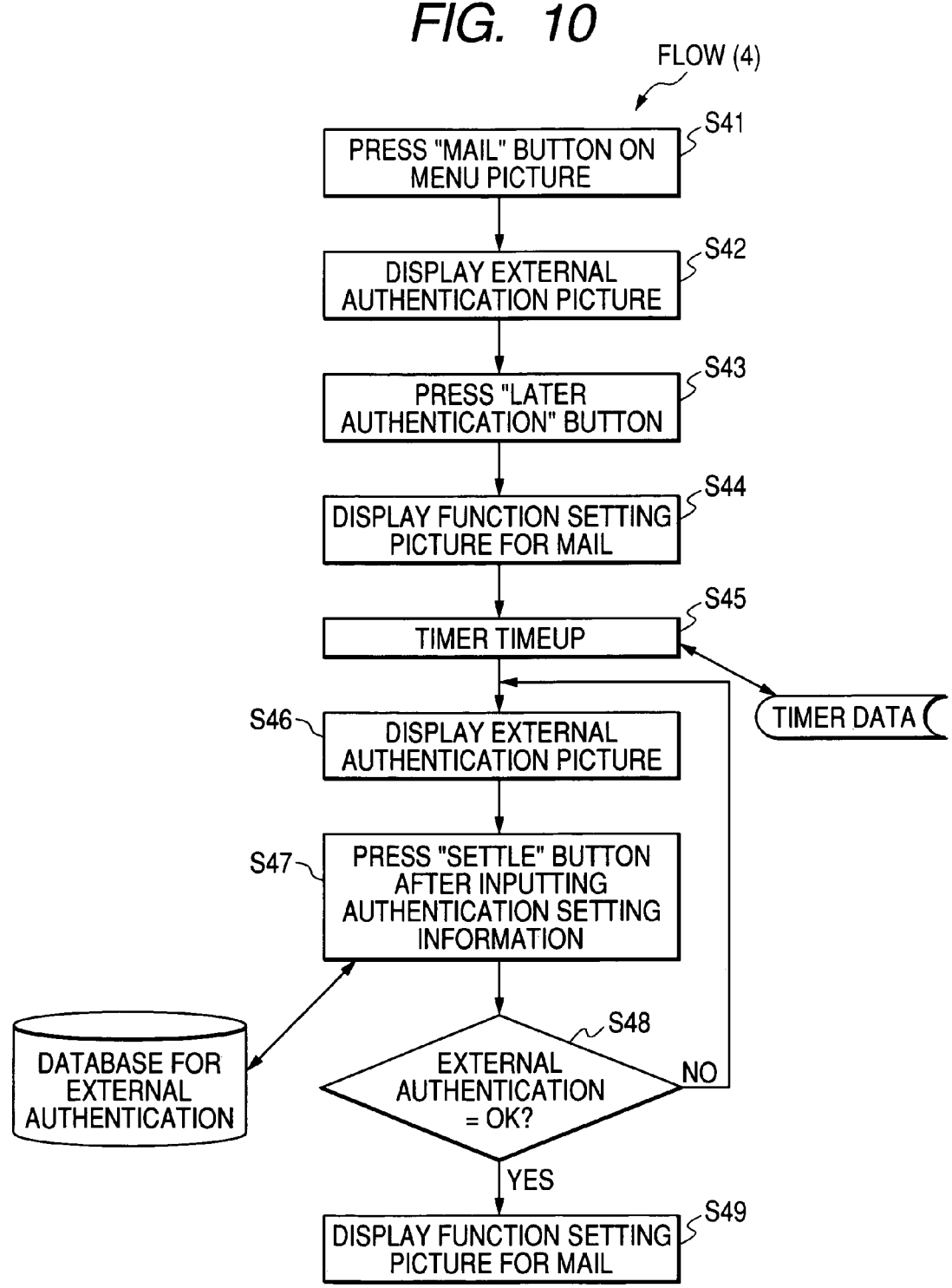
FIG. 10 is a flowchart explaining a fourth control procedure.

Next, a fourth procedure will be described with reference to the flowchart (Flow (4)) of FIG. 10. When a user selects and presses the "mail" button on the menu picture (see FIG. 3) (step S41), an external authentication picture (see FIG. 4) is displayed (step S42).

Next, when the "later authentication" button on the authentication picture is pressed (step S43), the authentication process is not performed at that time but the function setting picture for a mail shown in FIG. 5 is displayed (step S44). In the course of performing the input for a variety of settings, a timer is started. The timer counts a predetermined time on the basis of timer data set in advance and the timer is stopped after the predetermined time (step S45).

After the timer is stopped, the external authentication picture (see FIG. 4) is displayed (step S46). In this case, the setting picture may be changed and displayed as the external authentication picture, a particular window may be displayed over the setting picture, and both pictures may be simultaneously displayed in a separated way as shown in FIG. 6.

Next, when a login name or password is input to the text box on the authentication picture and the "settle" button is pressed (step S47), the CPU 50$a$ shown in FIG. 1 requests the authentication server 71 for the authentication process via the external network 62 from the NCU 60 and waits for acquiring the authentication (step S48). The authentication server 71 is provided with the database for the external authentication, and the authentication process is performed using the database. Here, when the authentication is not acquired, the procedure returns to step S46.

When the authentication is acquired, the function setting picture for a mail can be restored (step S49) and the settings can be successively performed.

In the procedure of Flow (4), the authentication process by the authentication server 71 connected to the external network 62 can be automatically urged after the predetermined time passes in the course of performing a variety of settings for a service requiring the authentication such as a mail, so that it is possible to prevent miss of the authentication and thus to securely perform the authentication process.

Figure 11:
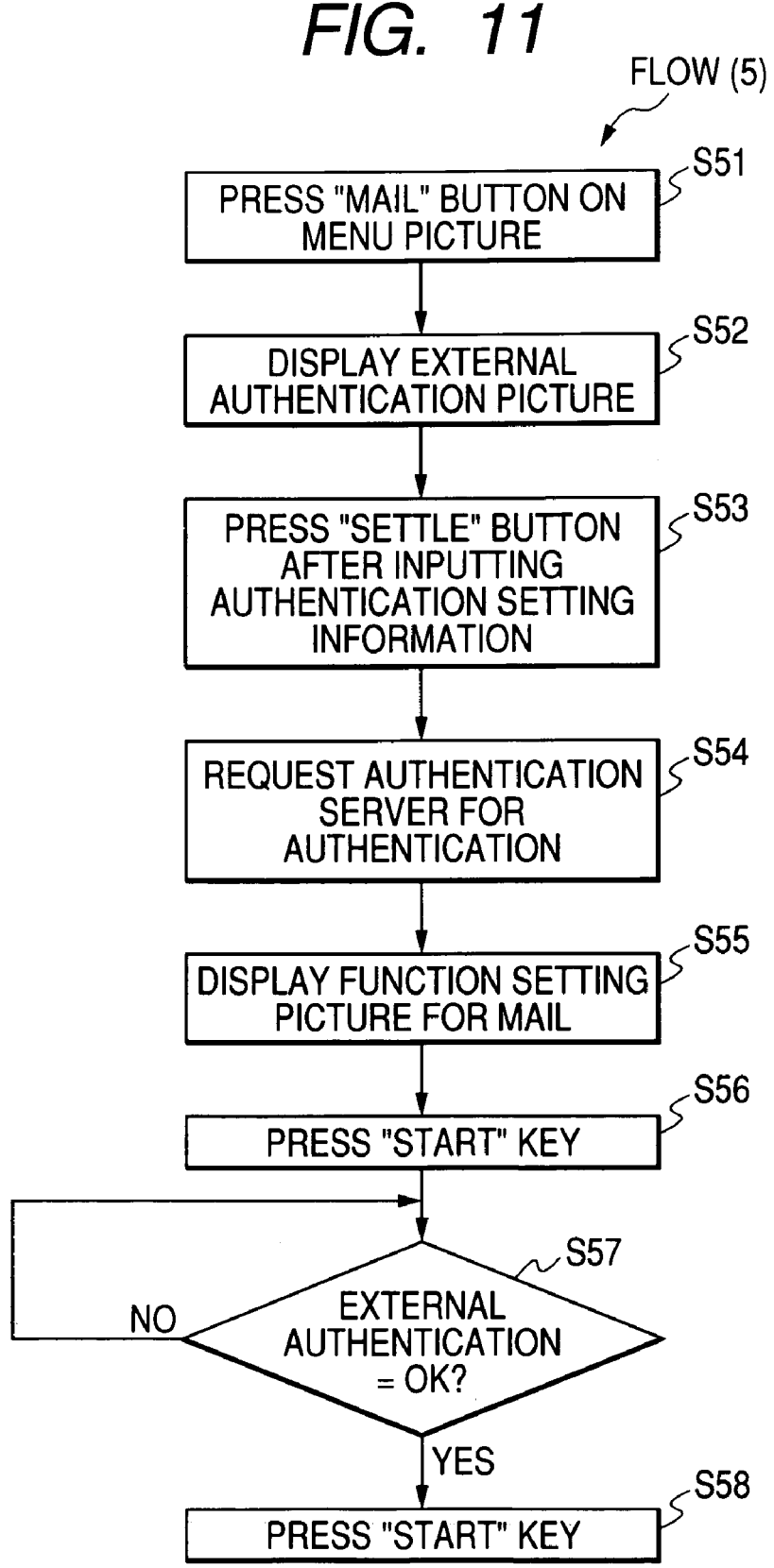
FIG. 11 is a flowchart explaining a fifth control procedure.

Next, a fifth procedure will be described with reference to the flowchart (Flow (5)) of FIG. 11. When a user selects and presses the "mail" button on the menu picture (see FIG. 3) (step S51), an external authentication picture (see FIG. 4) is displayed (step S52).

Next, when a login name or password is input to the text box on the authentication picture and the "settle" button is pressed (step S53), the CPU 50$a$ shown in FIG. 1 requests the authentication server 71 for the authentication process via the external network 62 from the NCU 60 (step S54). The authentication server 71 is provided with a database for the external authentication, and the authentication process is performed using the database. Much time may be required for the authentication process by the authentication server 71, and much time may be required depending upon a load condition of the network 62 between the image processing apparatus 1 and the authentication server 71. In this procedure, by displaying the function setting picture for a mail shown in FIG. 5, it is possible to perform the input for a variety of settings (step S55), even before the authentication is acquired.

When the "start" key on the control panel 16 shown in FIG. 2 is pressed (step S56) after performing a variety of settings, it is determined whether the authentication by the authentication server 71 is acquired. When the authentication is acquired, the job for a mail is started, and when the authentication is not acquired, a message such as "Wait for authentication. Start after acquiring authentication" is displayed on the screen, and the procedure is standing by ready until acquiring the authentication (step S57). When the authentication is acquired at step S56, the job for a mail is started (step S58).

In the procedure of Flow (5), the authentication server 71 connected to the external network 62 is requested for the authentication process, a variety of settings can be performed even when much time is required for the authentication process, and when the authentication is acquired at the time of instructing the start, the job is started. As a result, even when a user selects a service requiring authentication and much time is required for acquiring the authentication, it is possible to perform the setting for the service and the instruction of start thereof without waiting until acquiring the authentication.

Figure 12:
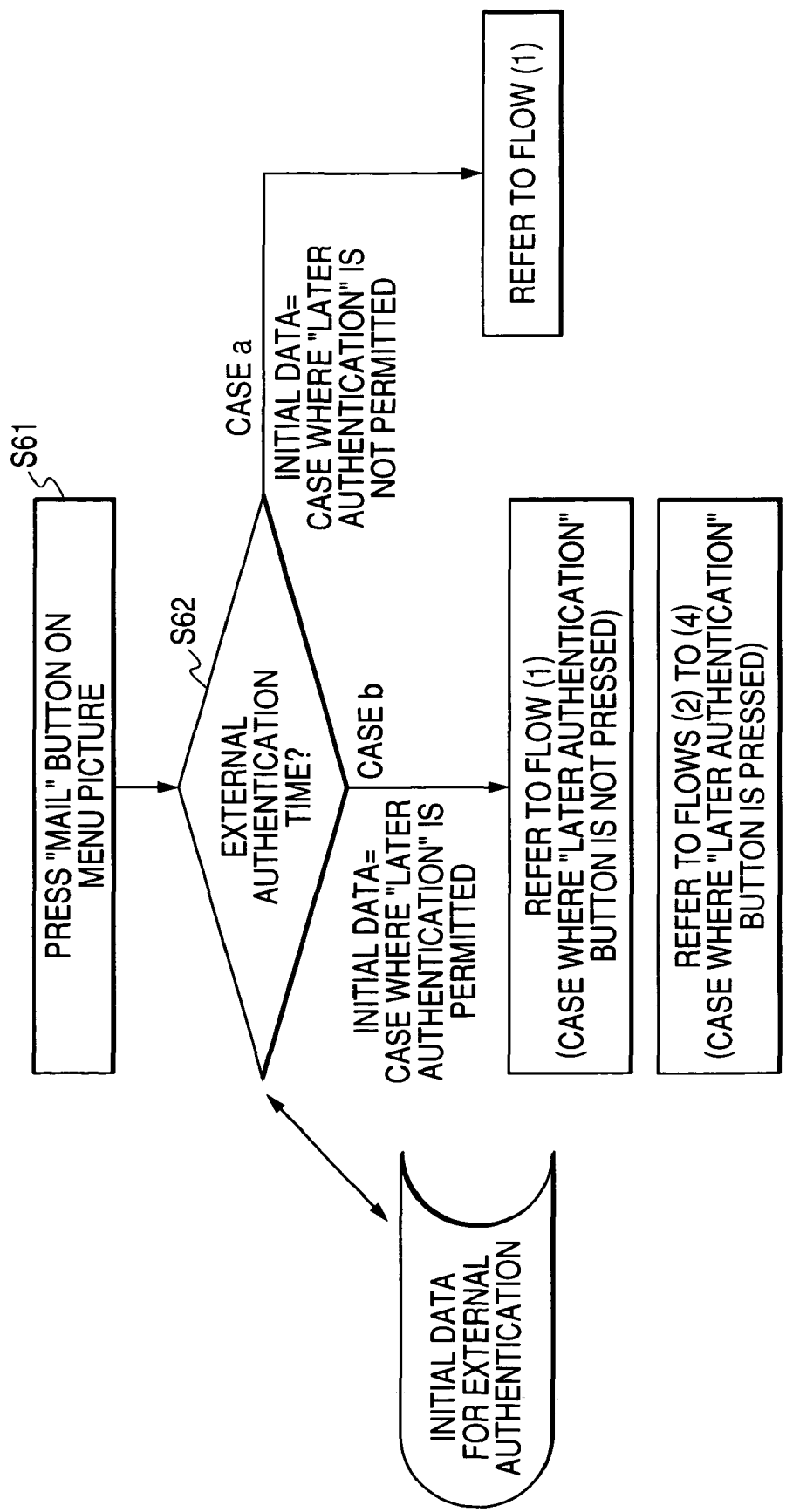
FIG. 12 is a flowchart explaining processes when a time for authentication is arbitrarily set.

FIG. 12 is a flowchart explaining processes when the time for authentication is arbitrarily set. First, when a user selects and presses the "mail" button on the menu picture (see FIG. 3) (step S61), the time for the external authentication is determined (step S62). The time for the external authentication is set in advance as initial data for the external authentication and the time for the external authentication is determined with reference to this data.

A case where the initial data for the external authentication is set not to permit the "later authentication", such as a case where it is set to refer to the latest address list when searching for the mail addresses, belongs to Case a and the procedure of Flow (1) described above is performed. On the other hand, a case where the initial data for the external authentication is set to permit the "later authentication", such as a case where the authentication is preferably performed when the mail server is requested to process the mail job generated by the image processing apparatus 1 like the normal mail transmitting process, belongs to Case b. In this case, when a user does not press the "later authentication" on the authentication picture, the procedure of Flow (1) is performed, and when the user presses the "later authentication" button on the authentication picture, the procedure of any one of Flows (2) to (4) is performed.

The initial data for the external authentication can be set by a machine operator of the image processing apparatus 1, and can be changed for the purpose of convenience of a user.

Figure 13A:
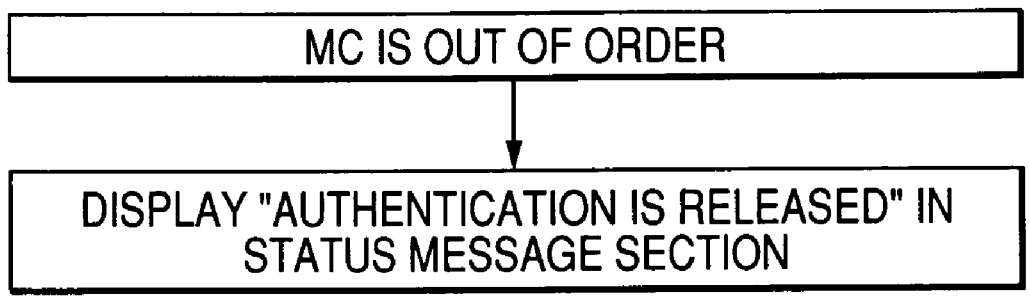
FIGS. 13A and 13B are flowcharts explaining processes when the image processing apparatus is out of order.
Figure 13B:
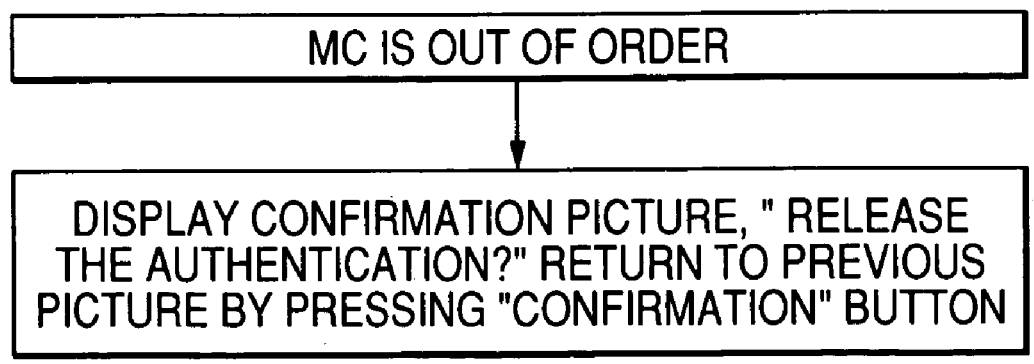

Next, the procedures shown in FIGS. 13A and 13B show processes when the image processing apparatus is out of order due to a certain reason. In the procedure shown in FIG. 13A, when the image processing apparatus is out of order, "authentication is released" is displayed in the message display section of the screen display, and then the external authentication is automatically released. As a result, even when a trouble takes place in a state where the authentication is acquired, it is possible to automatically release the authentication without leaving the authentication status as it is.

In the procedure shown in FIG. 13B, when the image processing apparatus is out of order, a confirmation picture of "Do you release the authentication?" is displayed, the authentication is released by pressing the "confirmation" button, the release of authentication is not performed by pressing the "not release" button, and the previous picture is restored. As a result, when a trouble takes place in a state where the authentication is acquired, it is possible to select whether to release the authentication, so that it is possible to release the authentication in accordance with selection of a user.

The authentication process described above is a function of the "job memory" on the menu picture shown in FIG. 3 and may be stored. The function of the "job memory" is a function of sequentially storing the manipulation and input procedure by a user on various function setting pictures, and the stored manipulation and input procedure can be called and retrieved. In this case, when the authentication process is included and stored in the "job memory", the input account name and password may be included and stored in the job memory. Since it cannot be said that the "job memory" is called by the same user, the job memory may be retrieved by other accounts, and the password may be known to others and may be utilized by others. As a result, in the case of operation including the authentication process, a method of not storing the account name and password on the authentication picture may be employed. Even when the account name and password input through the authentication picture are stored, it is possible to allow the login name and password for authentication to be input, by suspending the retrieval before performing the authentication process.

In the embodiments described above, the example has been described where a unit providing a service, such as the mail server 72, and the authentication server 71 performing the authentication for enjoying the service are connected to the network to which the image processing apparatus can be connected. As a result, when enjoying other services via the network as well as the service of the mail server 72, a user can utilize the services via the network, only by acquiring the authentication by the authentication server 71. The authentication server 71 and the mail server 72 may be formed as one unit.

The entire disclosure of Japanese Patent Application No. 2004-000991 filed on Jan. 6, 2004 and No. 2004-375561 filed on Dec. 27, 2004 including specification, claims, drawings and abstract is incorporated herein by reference in its entirety.

What is claimed is:

1. An image processing apparatus comprising:
an input unit configured to input an image;
a network control unit configured to perform connection to an external network;
an output unit configured to output the image to the external network; and
a control unit configured to perform connection to an authentication unit connected to the external network using the network control unit and to request the authentication unit for an authentication process, wherein,
for each of a plurality of functions that are selectable by a user, the control unit stores in advance information from the user as to whether or not inputting authentication setting information is required before inputting another setting information,
when the selected function requests the output unit to output the image to the external network and the information stored by the control unit for the selected function is that inputting the authentication setting information is required before inputting the other setting information, the control unit requires the user to input the authentication setting information before inputting the other setting information, and when the selected function requests the output unit to output the image to the external network and the information stored by the control unit for the selected function is that inputting the authentication setting information is not required before inputting the other setting information, the control unit presents to the user options including (i) inputting authentication setting information before inputting another setting information and (ii) inputting the authentication setting information after inputting said another setting information.

2. The image processing apparatus according to claim 1, wherein the control unit requests the authentication unit to release the authentication process, when the image processing apparatus is out of order after acquiring the authentication by the authentication unit.

3. The image processing apparatus according to claim 1, wherein the control unit gives an instruction to select whether to request the authentication unit to release the authentication process, when the image processing apparatus is out of order after acquiring the authentication by the authentication unit.

4. The image processing apparatus according to claim 1, further comprising:

a storage unit to store a processing procedure of the input unit or the output unit, wherein the control unit allows the storage unit to store the authentication process in the processing procedure.

5. The image processing apparatus according to claim 4, wherein the control unit suspends retrieval of the processing procedure stored in the storage unit before performing the authentication process, when retrieving the processing procedure.

6. The image processing apparatus according to claim 1, wherein when an instruction of outputting the image is given, the control unit determines as to whether or not the authentication process has been performed by the authentication unit, and when it is determined that the authentication process has not been performed, the control unit suspends the output of the image.

* * * * *